United States Patent Office

2,840,586
Patented June 24, 1958

2,840,586

INTERMEDIATES FOR THE PREPARATION OF CAROTENOIDS

Hans Herloff Inhoffen, Braunschweig, Germany, assignor to Hoffmann-La Roche Inc., Nutley, N. J., a corporation of New Jersey No Drawing. Application December 18, 1953
Serial No. 399,171

Claims priority, application Switzerland
December 23, 1952

3 Claims. (Cl. 260—410.9)

The present invention provides novel polyene compounds of the general formula

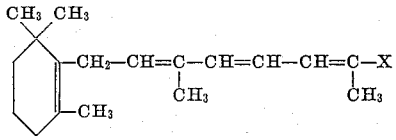

wherein X stands for a carbalkoxy, carboxy or oxymethyl group. The said polyene compounds are useful as intermediates in the synthesis of $\beta$-carotene and carotenoids.

The invention further provides a process for the manufacture of the above polyene compounds, which process comprises condensing 4-[2′,6′,6′-trimethylcyclohexene-(1′)-yl]-2-methyl-butene-(2)-al-(1) (hereinafter called $\beta$-$C_{14}$-aldehyde) by means of a Reformatzky reaction with a $\gamma$-bromo-tiglic acid ester and dehydrating the condensation product formed to produce 8-[2′,6′,6′-trimethyl-cyclohexene - (1′) - yl] - 2,6 - dimethyloctatriene-(2,4,6)-oic acid ester (hereinafter called $\beta$-$C_{19}$-ester). The latter may then be saponified to the free acid or may be reduced to the corresponding $C_{19}$-alcohol (8-[2′,6′,6′-trimethyl - cyclohexene - (1′) - yl] - 2,6 - dimethylocta-triene-(2,4,6)-ol-(1)).

The $\beta$-$C_{19}$-ester may be transformed into 8-[2′,6′,6′-trimethyl - cyclohexene - (1′) - yl] - 2,6 - dimethyl-octatriene - (2,4,6) - al - (1) (hereinafter called $\beta$-$C_{19}$-aldehyde), for example by reducing the B-$C_{19}$-ester, preferably with lithium aluminum-hydride or lithium-boron-hydride to the $\beta$-$C_{19}$-alcohol, whereupon the latter may then be oxydized to the known $\beta$-$C_{19}$-aldehyde (Annalen der Chemie, 575 [1952], page 105).

The $\gamma$-bromo-tiglic acid ester used as starting material may be prepared for example as follows: 152 g. (1 mol) of tiglic acid methylester are dissolved in 200 cc. of carbon tetrachloride, 263 g. (1.1 mol) of N-bromo-succinimide are added and the solution is refluxed for 2½ hours while exposing the same to light. Thereafter, the mixture is kept for 3 hours at —18° C., whereupon the succinimide precipitated is sucked off. After having removed the carbon tetrachloride, the bromo-tiglic ester is fractionated in vacuo. Boiling point$_{11 \text{ mm.}}$ 90–92° C. Yield: 163.5 g. (63.5%).

EXAMPLE 1

Preparation of $\beta$-$C_{19}$-ester 38.4 g. (1 mol) of $\beta$-$C_{14}$-aldehyde in 60 cc. of benzene are added to 17.8 g. of activated zinc (1.1 mol, with respect to $\gamma$-bromo-tiglic acid methylester). The mixture is cautiously heated to boiling on an open flame and a solution of 48 g. (1.34 mol, with respect to $\beta$-$C_{14}$-aldehyde) $\gamma$-bromo-tiglic acid methylester in 60 cc. of benzene is added dropwise thereto. After addition of about 5 cc. of this solution, heating is discontinued. The further addition of the benzene solution of $\gamma$-bromo-tiglic acid methyl-ester is adjusted so that the mixture keeps boiling, the color thereof turning slowly to red-brown. The solution is subsequently refluxed for ½ hour.

The solution is then treated with 200 cc. of 10 percent acetic acid, while cooling with ice water, and the benzene phase is separated. The acetic acid solution is extracted with ether, the ethereal extracts are combined with the benzene phase, the combined phases are washed neutral, dried and the solvents are removed. A red-brown oil is obtained.

The splitting off of water is effected, after having removed the tiglic acid methylester formed, by boiling for 10 minutes in high vacuo at a bath temperature of 120° C.

The purification of the $\beta$-$C_{19}$-ester thus obtained may be carried out for example as follows: To the crude ester are added 150 cc. of 10 percent methanolic potassium hydroxide solution and the mixture is refluxed for 2 hours. After cooling, the mixture is diluted with 225 cc. of water to form an approximately 30 percent methanol solution and, by extraction with ether, some $C_{14}$-aldehyde is removed. After having acidified the alkaline aqueous phase with 10 percent sulfuric acid, the $C_{19}$-acid is extracted with ether, the ether solution is washed, dried and evaporated. To the residue, consisting of 35 g. of a red-brown oil, are added 20 cc. of acetone. After 3 days' standing at —18° C., the crystalline precipitate is filtered off. After repeated recrystallizations from acetone, the $\beta$-$C_{19}$-acid is obtained in form of thick pale lemon-yellow colored crystals of melting point 147.5–148.5° C. (non-corrected) $\lambda_{\max}$. 302 m$\mu$, $\epsilon$=41800 (in methanol). The crystalline acid is re-esterified by dissolving in ether and adding dropwise thereto an ethereal solution of diazo methane at 0° C. until the mixture turns yellow. After standing for 20 minutes, the solution is treated with 10 percent acetic acid, the ethereal phase is washed, dried and the ether is removed. The $\beta$-$C_{19}$-methylester thus purified is a yellow oil with $\lambda_{\max}$. 310 m$\mu$.

EXAMPLE 2

Preparation of $\beta$-$C_{19}$-alcohol 294.4 mg. of $\beta$-$C_{19}$-methylester in 15 cc. of ether are added dropwise at —28° C. to an ethereal solution of 28 mg. of lithium-aluminumhydride (0.75 mol). After one hour, the solution is slowly brought to 0° C. and, by means of methanol, lithiumaluminumhydride in excess is destroyed. Ammonium chloride is added to the mixture, the latter is extracted with ether, the ethereal phases are washed with water, dried and the ether is removed. The $\beta$-$C_{19}$-alcohol thus obtained is a yellow oil. $\lambda_{\max}$. 278 m$\mu$, $\epsilon$=37700 (in methanol).

EXAMPLE 3

Preparation of the $C_{19}$-aldehyde 261.4 mg. $\beta$-$C_{19}$-alcohol are dissolved in 25 cc. of petroleum ether (40–50° C.) and 1.5 g. manganese dioxide are added thereto. After one hour's shaking at room temperature, the solution is filtered, the manganese dioxide is extracted 4 times with 50 cc. each of boiling ether, the ethereal phases are combined with the petroleum ether phase and the solvents are removed. 245 mg. of pale yellow oil are obtained. $\lambda_{\max}$. 328 m$\mu$, $\epsilon$= 32200 (in methanol).

For purification purposes, 120 mg. of this oil are passed through a column (15 cm. long, 0.8 cm. wide) of aluminum oxide (activity 1–2) by means of a mixture of petroleum ether (40–50° C.) with increasing amounts of benzene. The $C_{19}$-aldehyde is already eluted 0–20 percent benzene being added. After removal of the solvents, the aldehyde crystallizes in honey-yellow prisms $\lambda_{\max}$.

328 mμ, ε=45300 (in methanol). The phenylsemicarbazone of the $C_{19}$-aldehyde, obtained from the portions which have not been passed through the aluminumoxide, shows the following absorption maxima:

$\lambda_{max}$ 333, 347 mμ; ε=71600 and 66100 (in methanol)

I claim:
1. 8 - [2',6',6' - trimethylcyclohexene - (1') - yl] - 2,6-dimethyl-octatriene-(2,4,6)-oic acid.
2. 8 - [2',6',6' - trimethylcyclohexene - (1') - yl] - 2,6-dimethyl-octatriene-(2,4,6)-oic acid ester.
3. 8 - [2',6',6' - trimethylcyclohexene - (1') - yl] - 2,6-dimethyl-octatriene-(2,4,6)-ol-(1).

References Cited in the file of this patent
UNITED STATES PATENTS

| | | |
|---|---|---|
| 2,657,219 | Isler et al. | Oct. 27, 1953 |
| 2,683,747 | Benton et al. | July 13, 1954 |

OTHER REFERENCES

Harper et al.: Chemistry and Industry, vol. 29, pp. 574–5 (1950).

Inhoffen et al., Annalen der Chemie, 570, 54–69 (1950), especially page 59.

"Die Chemie des Vitamin A" by Dr. Otto Isler Separatabdruck aus "Chimia," vol. 4, May 1950, pp. 103–118 (attention page 113.).